Oct. 3, 1967  B. WALLACE  3,345,609
TURN SIGNAL CONTROL SYSTEM
Filed March 11, 1965  6 Sheets-Sheet 2

BAIRD WALLACE
INVENTOR

BY John H. Faulkner
Robert E. McCollum
ATTORNEYS

BAIRD WALLACE
INVENTOR

BY John R. Faulkner
Robert E. McCallum
ATTORNEYS

United States Patent Office
3,345,609
Patented Oct. 3, 1967

3,345,609
TURN SIGNAL CONTROL SYSTEM
Baird Wallace, Grosse Ile, Mich., assignor to Ford Motor Corporation, Dearborn, Mich., a corporation of Delaware
Filed Mar. 11, 1965, Ser. No. 438,918
6 Claims. (Cl. 340—81)

ABSTRACT OF THE DISCLOSURE

A motor vehicle has a pair of laterally spaced hand grips located in the operator's compartment of the vehicle that are adapted to be grasped and rotated by the operator for providing steering control of the vehicle; the grips are interconnected for simultaneous rotation, by chain and sprocket drive transfer means, to the vehicle steering column for rotation of it; the grips are supported in columns one of which contains a turn signal lever connected to an electrical circuit having only two lines and a ground providing full turn signal control functions; the turn signal lever is spring centered and movable to one lateral position to establish one turn signal circuit, the circuit selected being cancelled either automatically by a predetermined rotation of the steering column, or, manually by temporarily moving the turn signal lever to establish the opposite turn signal circuit and then releasing the lever to permit it to be spring returned to its center rest position and, of which the following is a specification.

This invention relates in general to a motor vehicle, and more particularly to a turn signal control system.

One of the objects of the invention is to provide a turn signal control system that provides complete turn signal control function with only two lines and a ground connected to an operator's control.

A further object of the invention is to provide a turn signal control that is biased at all times to an inoperative rest position, and is movable to an operative position by the vehicle operator.

A further object of the invention is to provide an overcontrol to cancel at will the signal for an unperformed turn by momentarily engaging the opposite turn signal circuit.

A still further object of the invention is to provide a turn signal system consisting of an operator movable lever oscillatable to opposite sides of a rest position to activate left or right turn signal circuits, and one in which a manual cancellation of the particular turn signal circuit selected is made by temporarily establishing the circuit indicating a turn to be made in the opposite direction.

Other objects, features and advantages of the invention will become apparent upon reference to the succeeding, detailed description thereof, and to the drawings illustrating the preferred embodiment thereof; wherein.

Figure 1:
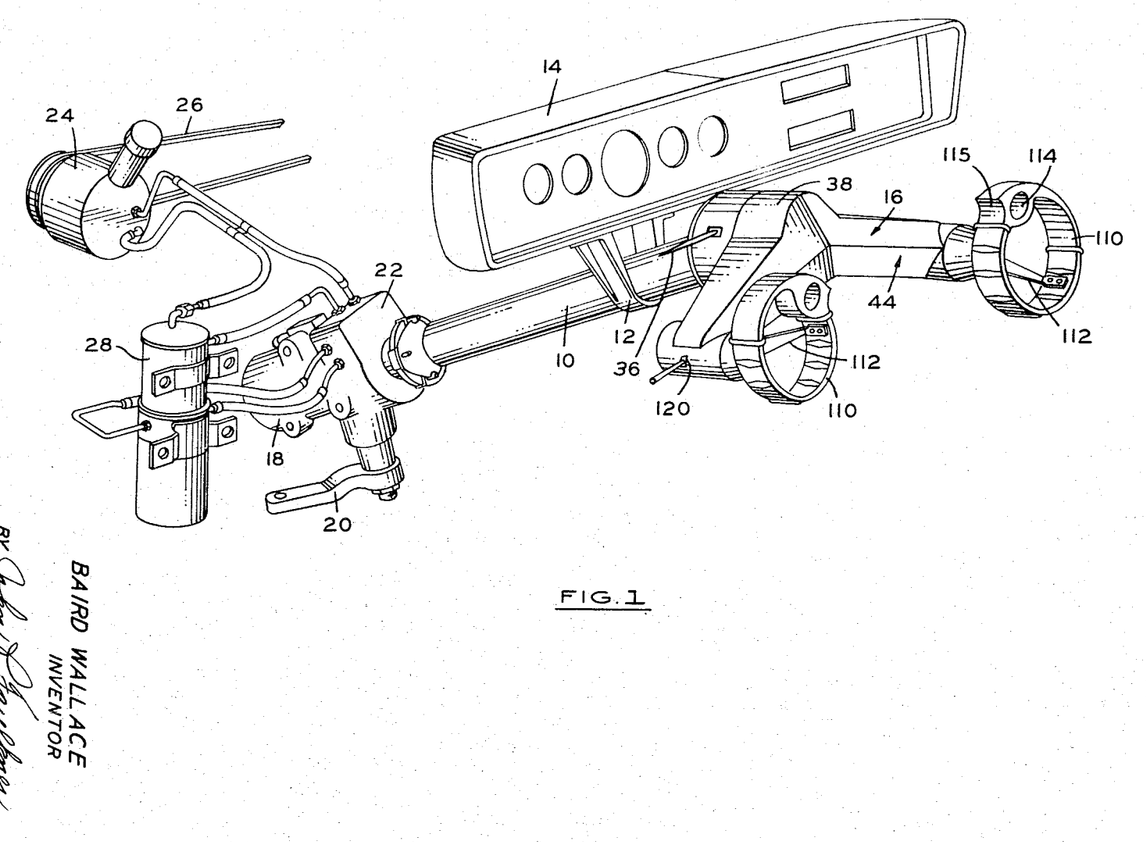
FIGURE 1 is a perspective view of a steering control mechanism embodying the invention.

FIGURE 1 shows, isometrically, a portion of a steering control mechanism for a motor vehicle. A conventional steering column 10 is partially supported in a bracket 12 secured to a vehicle instrument panel or dash 14. At its upper end, the steering column is pivotally secured to an operator movable steering control means 16. At its lower end, column 10 is fixed to a steering gear indicated at 18 having a linkage 20. The steering gear in this case is a power operated unit, and includes an auxiliary or emergency power steering unit 22 that automatically takes over in the event of a failure in the main power steering circuit. The power steering unit is supplied with fluid from a main pump unit 24 driven from the engine by a belt 26. The auxiliary pump, electric motor and reservoir are contained in an assembly 28.

Figure 2:
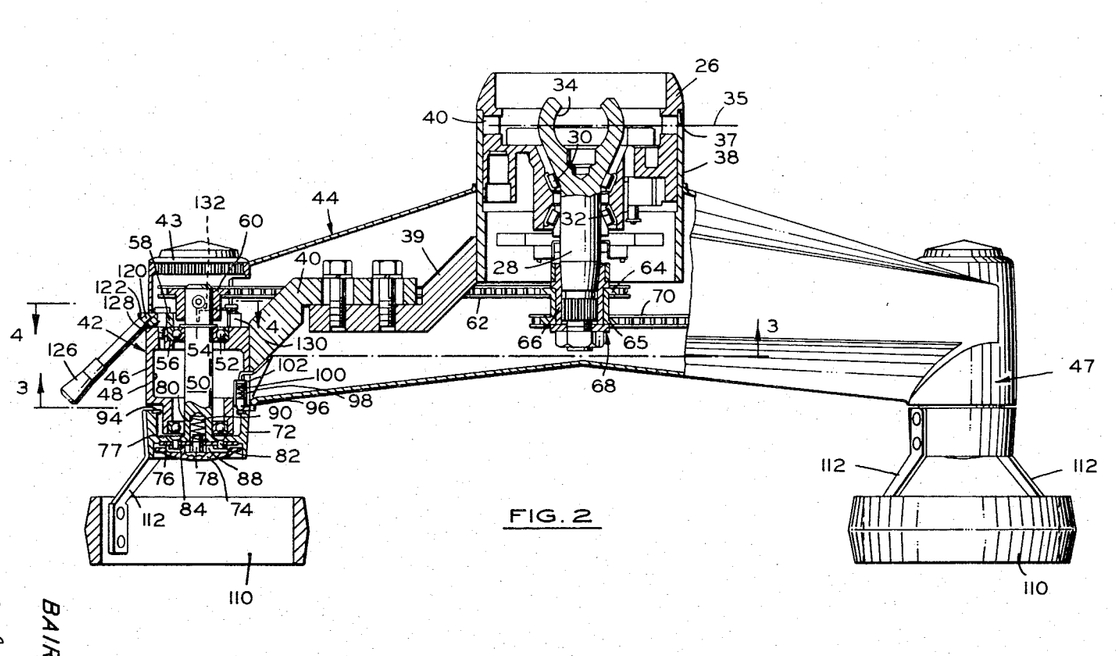
FIGURE 2 is a plan view with parts broken away and in section of details of the steering control of FIGURE 1.

FIGURE 2, which is essentially to scale, shows the details of construction of the operator-movable steering control unit 16. It has a main annular housing and fairing member 26 that supports the upper end of a conventional steering column 28 on pairs of spaced annular bearings 30 and 32. The yoke end 34 of column 28 provides a universal connection to the lower portion (not shown) of the steering column so that shaft 28 not only can be rotated, but also the entire steering control unit 16 can be tilted about an axis 35 passing through yoke 34. The mechanism for tilting the steering control shown in FIGURE 2 with respect to the steering column is not shown since it is known and is believed to be unnecessary for an understanding of the invention. Suffice it to say that a lever 36, shown in FIGURE 1, would be used to release the steering control 16 for angular movement to any one of several pivotal positions.

Support 26 is provided with an annular shoulder 37 against which is located an annular shroud or fairing 38 that is secured to support 26 by bolts or screws (not shown). Shroud 38 extends rearwardly towards the vehicle passenger compartment to enclose the upper extremity of steering column 28. A pair of laterally extending support arms 39 are welded to shroud 38 at one end, and are bolted to an equal number of laterally extending support arms 40. Arms 40 are in turn welded to a pair of secondary housings 42.

The upper part of each housing 42 is closed by an annular cap 43 that has a pressfit within the end of the casing. A streamlined annular casing 44 is fixedly secured to the sides of each of housings 42 and cap 43, and to shroud 38, for enclosing the wing and central portions of the steering unit and providing a streamlined appearance to them. Both housings 42 are constructed in substantially the same manner, except for the turn signal mechanism forming part of the lefthand housing 46; therefore, only the details of one will be given.

The left hand housing 46 has a hollow interior 48, and rotatably supports a steering control shaft 50 on a pair of spaced bearings 52. The shaft is located axially in one direction by a snap ring 54 in a groove in the shaft. The bearings are located axially in one direction against a shoulder 56 on casing 42 and in the other direction by a spring centered turn signal actuator member 58. The actuator is pivotally secured to casing 42, and will be described in more detail later.

The upper portion of shaft 50 has a pinned connection to a sprocket wheel 60. A chain member 62 is trained around wheel 60 and also around one portion 64 of a double sprocket wheel secured on steering column 28. The double sprocket wheel is formed on a sleeve 66 wedgingly secured on the end of steering column 28 by a lock and washer assembly 68. The second sprocket 65 is connected by a chain 70 to the drive sprocket (not shown) for the right hand steering control unit 47. The diameters of sprockets 60, 64 and 65 are suitably chosen to provide the proper ratio between turns of the sprocket wheel 56 and corresponding turns of the main steering column 28. It will be clear that any suitable combination of ratios could be used without departing from the scope of the invention.

The lower portion of shaft 50 is formed with an H or hat-shaped cross-section, as best seen in FIGURE 2. The annular peripheral portion 72 constitutes a fairing or streamlined housing within the open end of which is flush mounted a horn button 74. The horn button assembly includes an annular contact plate 76 that is copper faced on its side abutting web 77, and is centrally apertured to receive the stem 78 of the horn button in a suitable recess 80 in shaft 50. A horn contact plate 76 is fixed to web 77 by two screws 82 projecting through apertures in web 77 and engaging a centrally apertured annular contact retainer 84. The stem 78 of the horn button is maintained in place in recess 80 by a snap ring engaging a groove in the stem and abutting the upper side of plate 76. An annular sponge rubber-like spacer 88 is inserted between the horn button contact plate 76 and the horn button 74. A spring 90 normally biases the horn button outwardly to the position shown so that the edges of the horn button do not contact plate 76.

The contact plate 76 has a nylon wire (not shown) fixed to it. The wire is connected to an annular contact ring 94 fixed on the inner end of shroud 72. Ring 94 is engaged at all times by a horn brush 96 that is slidably mounted within an insulator 98 and spring biased by a spring 100 into engagement with ring 94. The spring 100 seats against a contact 102 connected by a wire to the vehicle horns, not shown.

As best seen on the right-hand side of FIGURE 2, and in FIGURE 1, an annular hand grip 110 is fixedly secured to shroud 72 by two diagonally extending web-like brackets 112 secured at opposite ends to shroud 72 and grip 110. As seen more clearly in FIGURE 3, the grip pis an annular member that may be molded of suitable material, such as plastic, for example, and has a finger or thumb opening 114 formed therein. At this enlarged portion of the hand grip, the portion 115 adjacent opening 114 is formed to the curvature of a thumb or finger so that the operator may rotate the hand grip in this manner, if desired, rather than by inserting the thumb in opening 114.

It will be clear from the description thus far, that the vehicle operator may grasp the hand grips 110 in his left and right hands in any comfortable manner, such as by inserting a finger or thumb in holes 114, or by positioning the thumb around the grip at the curved portion 115. Rotation of both hand grips in the same direction, that is, clockwise or counterclockwise, then rotates both steering control shafts 50 in the same direction. This rotates sprocket wheels 60 and 64, 65 in the same direction to turn steering column 28 in the desired direction and at the ratio determined by the diameters of the respective sprocket wheels.

It will be seen, therefore, that steering can be accomplished simply by rotating the hand grips in one direction or the other either by means of a single finger on one hand, both hands movable simultaneously in the same direction, or by any combination of finger movements so long as they are in the same direction with respect to left and right hands. Rotation of the hand grips rotates shafts 50 and sprocket wheels 60 and 64 to rotate steering column 28. The front wheels of the vehicle are then pivoted in a known manner. The arms of the vehicle driver may be comfortably supported upon arm rests so that the only action required is either a simple turning motion of the finger, or by a simple twisting of the wrist. No movement of the arms per se is necessary, thereby eliminating fatigue of the arms normally associated with operation of a conventional steering wheel over a long period of time.

It will be clear, of course, that the steering control described can be used with a constant ratio or a variable ratio steering gear, as desired, since as stated before, proper selection of the sprocket wheel diameters will control to a large extent the number of turns of the hand grips necessary to rotate steering column 28 from a lock-to-lock position.

As described previously, the left-hand steering control housing 46 incorporates a turn signal control mechanism. As best seen in FIGURES 1 and 2, casing 46 has an opening 120 through which extends a portion 122 of the yoke-shaped actuator 58 (seen from the bottom in FIGURE 4). Portion 122 is adapted to receive the end of a turn signal actuating lever 126. The yoke shaped actuator 58 is pivotally secured to casing 46 by a pivot pin 128. Accordingly, arcuate swinging movement of the turn signal lever 126 up or down from its central rest position will cause a rotation of the arms of yoke 58 in the opposite direction.

Figures 3, 4:
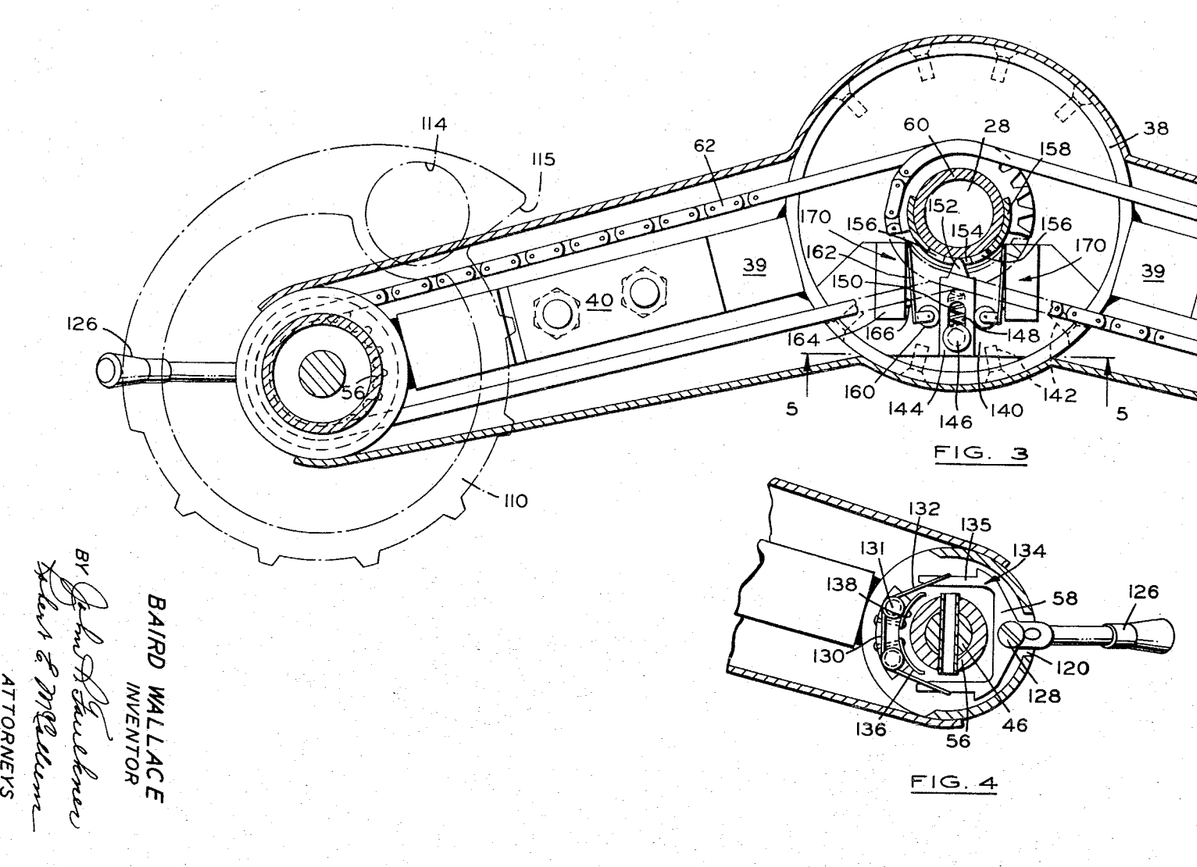
FIGURES 3 and 4 are cross-sectional views taken on planes indicated by and viewed in the direction of the arrows 3—3 and 4—4 of FIGURE 2.
Figure 5:
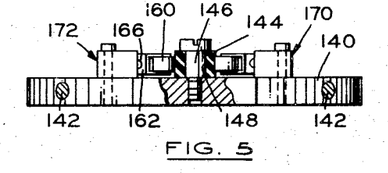
FIGURE 5 is a cross-sectional view taken on a plane indicated by and viewed in the direction of the arrows 5—5 of FIGURE 3.

Actuator 58 is connected to a switch mechanism for actuating the turn signal lamps of the motor vehicle. More specifically, as best seen in FIGURES 2 and 4, a switch insulator 130 is fixed to casing 46 by a number of screws 131. Wound around and between the screws is a turn signal lever centering spring 132 that is connected at opposite ends to the legs 134 of the actuator yoke 58. Two spring-like finger contacts 136 and 138 are riveted to the front of insulator 130, contact 136 being connected to that portion of the electrical circuit switch that activates the left-turn signal lamps, while contact 138 is connected to the circuit switch portion activating the right-turn signal lamps. This will become clearer later during the description of the electrical control circuit for this unit.

It will be clear, therefore, that upon movement of the turn signal indicating lever 126 upwardly in FIGURE 4, that the yoke portion of actuator 58 will rotate in a counterclockwise direction about pivot 128 to cause the leg 135 to engage contact 138 and, therefore, ground the switch for this portion of the circuit, the yoke acting as one side of the switch. Rotation of the actuator lever 126 in the opposite direction will, of course, ground the opposite contact portion 136 while opening portion 138. The centering spring 132 will return the actuating lever 126 to the neutral position shown immediately upon release of the lever by the vehicle operator. Therefore, it will be seen that the lever initiates the circuit to be activated, and returns the lever to a neutral position upon release of the vehicle operator.

Assume now that the particular turning circuit has been activated. It will be released automatically upon turn of the steering column in a direction opposite to the designated turning direction. This is accomplished as follows. As best seen in FIGURE 3, a turn signal release base plate 140 is secured by bolts 142 within annular shroud 38. A longitudinally extending movable actuator 144 is pivotally and slidably mounted on plate 140 by means of a pivot pin 146 extending through a slot 148 in the actuator 144 and secured to plate 140. A spring 150 extends between the end of the actuator slot 148 and pin 146. It biases a pointed end 152 of actuator 144 into the clearance space or aperture 154 provided between two lugs 156 extending axially from a semi-circular spring clip turn signal cancelling member 158. This latter member frictionally surrounds a portion of the center sprocket wheel 64 for rotation with it. The actuator 144 has parallel sides engaged by the wheels 150 of a pair of fingers 162 springedly mounted from the end of switches 170 and 172. Each switch has contacts consisting of the spring-like finger 162 and a second contact 166.

It will be clear that sidewise movement of the turn signal cancelling member 144, upon rotary movement of sprockets 60, 64, 65 by rotation of hand grips 110 in one direction or the other, causes one of the sets of contacts 162, 166 to open, while the other set remains closed. That is, if a right turn is indicated, and the steering grips 110 are rotated clockwise to initiate a right turn, the cancel actuator 144 will be rotated counterclockwise about the fixed pin 146 to maintain the right turn release switch 170 closed, while opening the left turn release switch 172. This will maintain the right front and rear flasher units activated while deactivating the left front and rear flusher units. After the turn has been completed, the steering grips 110 will be rotated in the counterclockwise or opposite direction to return the car to the straight-ahead position. This counterclockwise movement of the sprockets 60, 64 and 65 will then immediately cause lugs 156 to rotate the turn signal release actuator 144 clockwise, thereby opening switch 172 and breaking the circuit to the right side flasher units. This, therefore, cancels the turn signal circuit.

Figure 6:
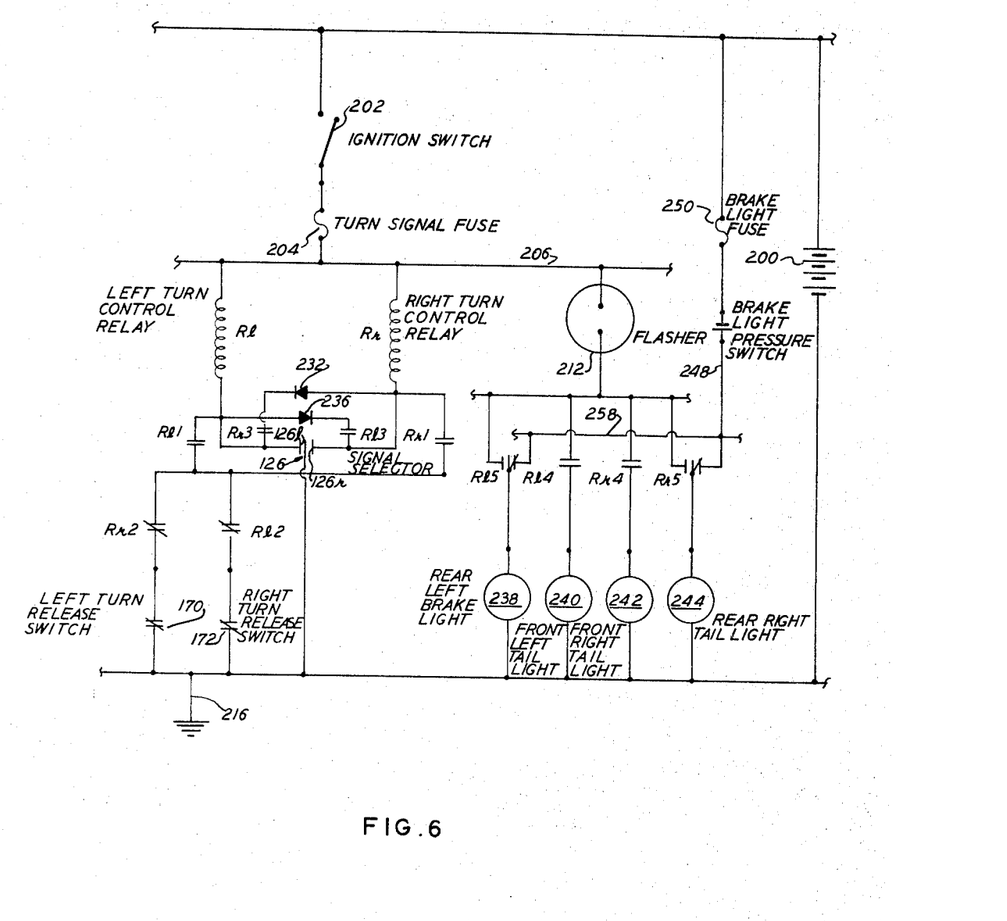
FIGURE 6 illustrates an electrical circuit control diagram.

FIGURE 6 shows diagrammatically the electrical circuit for the turn signal system described above. The system provides complete turn signal control function with only two lines and a ground to the operator controlled indicator lever 126. It includes a conventional motor vehicle 12 volt D.C. battery 200. It also includes an ignition switch 202 and a turn signal fuse 204 connected in series with a bus 206. Connected to the bus are right and left turn control relays Rl and Rr, and a turn signal flasher unit 212. Both of the relays Rl and Rr are connected to opposite sides of the double switch fingers 136, 138 controlled by the turn signal indicator lever 126, which has a ground connection at 216. The left turn control relay Rl also has a parallel conection to ground through a holding circuit consisting of a normally open switch $Rl_1$ controlled by relay Rl, a normally closed switch $Rr_2$ opened by energization of relay Rr, and the normally closed left turn signal release switch 170 (FIGURE 3) that is opened automatically upon turn of the steering wheel in the manner described previously.

The relay coil Rr also has a parallel circuit to the ground through a holding circuit consisting of a normally open switch $Rr_1$ closed upon energizaiton of relay Rr, a normally closed switch $Rl_2$ opened upon energization of coil Rl, and a right turn signal release switch 172 automatically opened upon turn of the steering wheel in a direction to actuate the microswitch 172 in FIGURE 3. The circuit for relay Rr also includes an additional circuit from relay Rl through a normally open switch $Rr_3$ closed by relay Rr, and a diode 232 connected to relay Rr. The circuit for relay Rr also includes a circuit including a normally open switch $Rl_3$ closed by relay Rl, and a diode 236 connected to the relay Rl.

The lines connected to the turn signal flasher unit 212 include left front and rear lamps 238 and 240, and right front and rear lamps 242 and 244. The left turn circuit includes a normally closed transfer switch $Rl_5$ which, when closed, connects the rear lamp 238 to the battery through a brake light pressure switch 248 and a brake light fuse 250. When switch $Rl_5$ transfers upon energization of relay Rl, the left rear and front lamps 238 and 240 are connected to the turn signal flasher unit 212.

The right turn lamp circuit is similar, and includes a transfer switch $Rr_5$ normally closed to connect the rear brake lamp 244 to the brake light pressure switch 248, and transfers to the turn signal flasher unit 212 upon energization of relay Rr closing normally open switch $Rr_4$ and transferring switch $Rr_5$.

The circuit diagram will become clearer upon a description of a normal operation of the turn signal system. When a turn to the left, for example, is desired, the vehicle operator pivots the turn signal selector lever 126 to the left to ground the contacts connected to relay Rl. This causes a circuit to be completed from the battery 200 through the closed ignition switch 202 and fuse 204 through relay Rl and switch 126l to the ground connection 216. This energizes coil Rl, closes switch $Rl_1$, and opens switch $Rl_2$. A holding circuit thus maintains coil Rl energized when the selector lever is released, from coil Rl through switch Rl, and switches $Rr_2$ and 170. The energization of coil Rl also causes switch $Rl_5$ to transfer and switch $Rl_4$ to close, thus completing a circuit through the front and rear left turn and brake lamps 240 and 238 to the flasher unit 212, which causes the lamps to flash intermittently in a known manner.

The flashing will continue until either one of two conditions occurs. The flashing will automatically be interrupted in a normal manner when the steering wheel is turned in a direction opposite to the turning direction, such as when the turn has been completed, and the vehicle wheels are being straightened. Clockwise rotation causes the lugs 156 on the spring clip 158 (FIGURE 3) to pivot actuator 144 to open left turn signal lamp switch 170, thus breaking the holding circuit for the coil Rl and interrupting the circuit to the flasher unit 212 and the left turn lamps 238 and 240.

The flashing can also be interrupted manually by an override, if a turn is not made after the selector lever 126 has been moved to indicate a turn. With the flashing and holding circuits established as described above for a left turn, for example, the vehicle operator interrupts the circuit by momentarily moving the indicator lever 126 to establish a right turn flashing circuit by grounding contacts 126r. This causes a circuit to be completed from battery 200 through ignition switch 202 and fuse 204, through coil Rr to ground 216 through the selector lever switch 126r. This energizes coil Rr. However, a holding circuit for the coil Rr is not established due to the coil Rl maintaining switch $Rl_2$ open. Simultaneously, switch $Rr_2$ opens to break the holding circuit for the left turn control relay Rl. This relay Rl, however, remains energized so long as switch 126r is held closed, through an auxiliary circuit consisting of coil Rl, a switch $Rr_3$, which is now closed, and a diode 232, through the connection to the selector lever 126r. At this time, only the relays Rl and Rr are energized. Therefore, as soon as the operator releases selector lever 126, switch 126r opens and breaks the circuit to both relays Rl and Rr, and thus interrupts the circuit to the turn signal flasher unit 212. The system now is in condition for normal actuation for either a left or right hand turn signal.

The operation of the control system for a right turn is substantially the same as described for that of a left turn, and, therefore, a repetition is believed to be unnecessary. In summary, the intermittent turn signal flashing is terminated automatically upon turning of the steering wheel in a direction to release either one or the other of the turn signal cancel switches 170 or 172. Alternately, if a turn remains unperformed, the circuits can be opened manually by momentarily moving the selector lever 126 to actuate the opposite turn indicator circuit, and then releasing the selector lever for its return to a rest position opening all circuits. The circuit also, of course, includes means for actuating the rear brake lamps during a braking condition; that is, depression of the vehicle brake pedal (not shown) closes switch 248 to establish a brake light control circuit from battery 200 through brake fuse 250 and switch 248 to a parallel connection 258 forming the normally closed transfer switches 246 and 254 to both rear brake lamps 238 and 244, and to the ground connection 216. The brake lamps are, therefore, actuated in a normal manner. If the right or left flasher units are also activated at this time, the transfer switch, $Rl_5$ or $Rr_5$, for the particular flasher unit to be activated will close its normally open contacts so that the brake circuit for that lamp is broken, while its lamp is connected to the turn signal flasher unit 212, and, therefore, is activated at that time for a flashing operation rather than a continuous glow brake operation.

Figure 7:
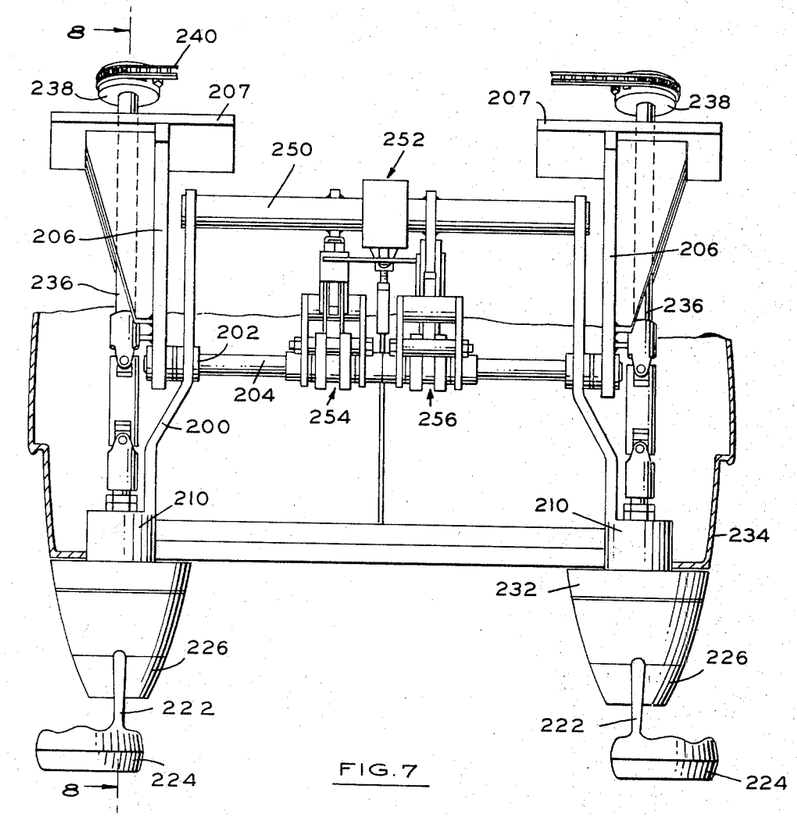
FIGURE 7 is a cross-sectional view of another embodiment of the invention.
Figure 8:
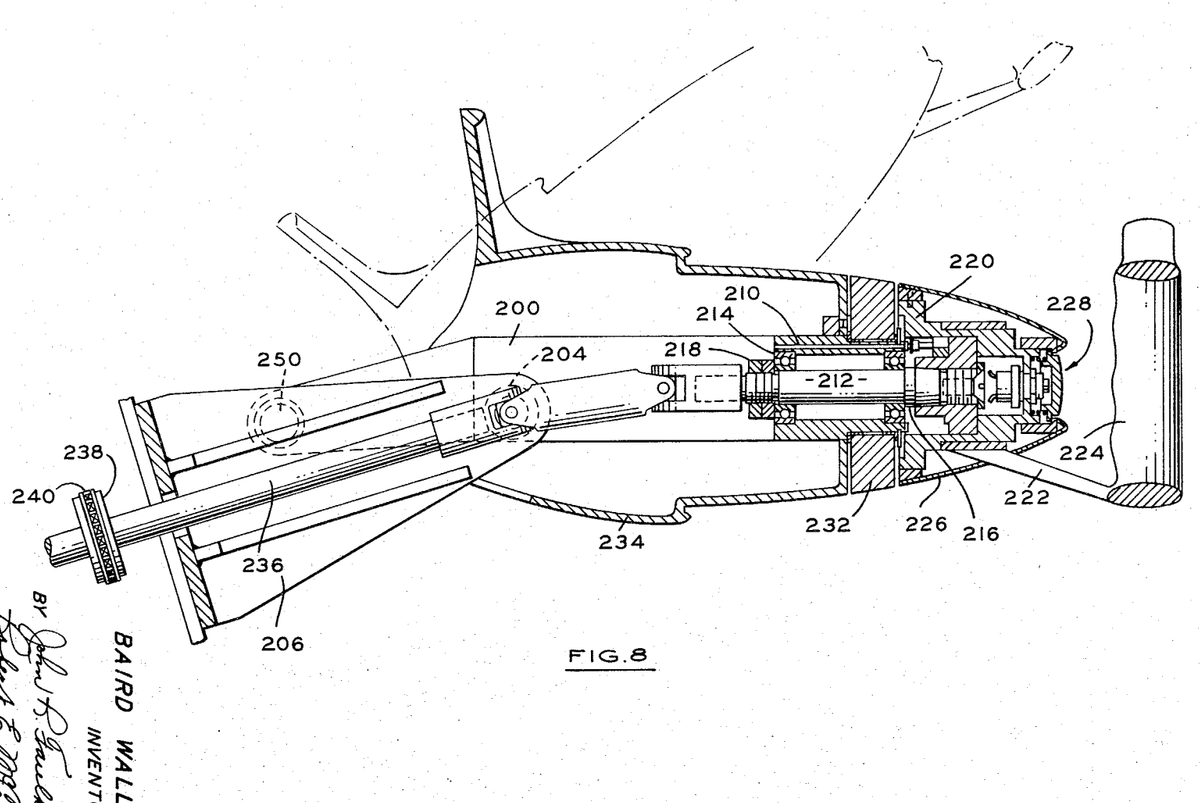
FIGURE 8 is an enlarged cross-sectional view taken on a plane indicated by and viewed in the direction of the arrows 8—8 of FIGURE 7.

FIGURES 7 and 8 show another embodiment of the invention. A pair of outwardly diverging support levers 200 are pivotally mounted on a shaft 204 that is mounted at its ends in the ends of a pair of fixed support arms 206. The arms 206 are in turn welded or fixed to a portion 207 of the vehicle chassis. Each of the forward ends of lever arms 200 are formed with an enlarged hollow boss 210 in which is rotatably mounted a steering control shaft 212. The shaft is mounted on suitable bearings 214 in a manner similar to the mounting of shafts 50 in casings 42 of the FIGURE 2 embodiment.

The upper end of each shaft 212 has an enlarged shoulder 216 bearing against the bearing 214 to locate the same in one axial direction, the bearings being located axially in the other directon by means of a nut 218. The upper portion of shaft 212 is suitably secured to an annular sleeve member 220 that is fixed by bracket members 222 to hand grips 224. A suitable fairing or streamline casing 226 surrounds the sleeve 220 and is bolted thereto.

The open upper end portion of sleeve 220 receives a horn button assembly 228 that operates in a manner similar to that described in connection with the FIGURES 1 to 6 embodiments. A second housing and fairing member 232 rotatably surrounds boss 210 and cooperates with a streamlined housing 234 enclosing the steering control unit.

The lower portion of steering control shafts 212 each have a universal connection with an angled shaft 236 that extends through the vehicle chassis support structure 206. While shaft 236 is rotatably mounted, it is otherwise non-movable. A suitable sprocket wheel 238 is fixed to shaft 236, and a chain 240 is trained over the wheel and a wheel (not shown) secured to the end of the steering column, not shown. It will thus be seen that rotation of the hand grips 222 in one direction or the other will cause a corresponding rotation of the sprocket wheels 238 to rotate the steering column in the desired manner.

Turning now to the pivotal movement of the entire steering unit, as stated previously, the two support lever arms 200 are pivotally mounted upon shaft 204. The lower end of levers 200 are fixed to a shaft 250. The central portion of shaft 250 contains a latching mechanism indicated in general at 252 that cooperates with two overrunning locking means indicated in general by the numerals 254 and 256. The details of these locking mechanisms are not given since they are known and are believed to be unnecessary for an understanding of the invention. Suffice it to say that upon movement of a release lever similar to lever 36 shown in FIGURE 1, that the entire hand grip assemblies can be rotated as a unit about shaft 204 to any one of a number of angular positions to arcuately move the steering assembly away from or towards the vehicle operator without interrupting the drive connection between the hand grips, shafts 212, and the chain sprocket drive connection to the steering column.

It will be seen from the embodiment illustrated in FIGURES 6 and 7 that the chain drive means for transferring the rotary movement of the hand grips 222 to the steering column can be located remote from the hand grip assemblies in a location on either side of the fire wall and, therefore, out of the passenger compartment of the vehicle. At the same time, the hand grip assemblies can be tilted as a unit to any one of numerous pivotal positions for easy ingress and egress of the operator from the motor vehicle.

While the invention has been illustrated in its preferred embodiment in the figures, it will be clear to those skilled in the arts to which the invention pertains that many changes and modifications may be made thereto without departing from the scope of the invention.

For example, a pair of actuating buttons, located one adjacent each of the hand grips 110 in FIGURE 1, could be used in place of the single turn signal control lever 126. That is, the buttons would be spring releasable and pressed individually by the operator to activate the particular circuit desired to indicate a right or left turn signal. If the turn is not performed, the signal would be cancelled by momentarily pressing the button to establish the signal circuit for a turn in a direction opposite to that previously selected, in a manner previously described.

I claim:

1. A directional signal system comprising, operator movable control means, pairs of normally unbridged contacts selectively bridged by said control means to energize separate circuits, holding circuit means energized upon bridging of said contacts to maintain energized the circuit associated with whichever of the said pair of contacts is bridged upon return of the said contacts to their normally unbridged condition, said holding circuit means being de-energized upon the movement of said operator control means momentarily to a position bridging the other pair of contacts to energize the other circuit and subsequently to a position wherein both pairs of said contacts are in their normally unbridged conditions.

2. A directional signal system comprising, operator movable control means, a pair of normally open switch means actuatable selectively by said control means to closed positions to energize separate circuits, said circuits each including a relay means, holding circuit means energized upon closure of said switch means to maintain energized the circuit associated with whichever of the said switch means is closed upon return of the said switch means to its normally open position, said holding circuit means for each circuit being connected in parallel to the circuit associated therewith and including a normally closed switch opened upon energization of the relay means associated with the other circuit, said holding circuit means for each circuit being de-energized upon the movement of said operator control means momentarily to a position closing the switch means associated with the other of said circuits and subsequently to a position wherein both of said switch means are in their normally open positions.

3. A directional signal system comprising, operator movable control means, a pair of normally open switch means actuatable selectively by said control means to closed positions to energize separate circuits, said circuits each including a relay means, holding circuit means energized upon closure of said switch means to maintain energized the circuit associated with whichever of the said switch means is closed upon return of the said switch means to its normally open position, said holding circuit means for each circuit being connected in parallel to the circuit associated therewith and including a normally closed switch opened upon energization of the relay means associated with the other circuit, said holding means for each circuit being de-energized upon the movement of said operator control means momentarily to a position closing the switch means associated with the other of said circuits, said relay means being de-energized upon subsequent movement of said control means to a position wherein both of said switch means are in their normally open positions.

4. A directional signal system comprising, operator movable control means, first and second normally open switch means actuatable selectively by said control means to closed positions to energize separate circuits, said circuits each including a relay means energized upon closing of the switch means associated therewith, holding circuit means energized upon closure of each of said switch means to maintain energized the circuit associated with whichever of the said switch means is closed upon return of the said switch means to its normally open position, each of said holding circuit means being connected in parallel with its circuit and including a normally closed switch opened upon energization of the relay means associated with the other circuit and a normally open switch closed upon energization of the relay means in its own circuit, said holding circuit means for said first switch means being de-energized by opening of said normally closed other circuit switch upon the movement of said operator control means momentarily to a position closing the second said switch means thereby energizing said other circuit relay means, the subsequent movement of said control means to position both of said first and second switch means in their normally open positions de-energizing both relay means and all of said circuits.

5. A motor vehicle turn signal control system comprising, an operator movable control lever biased to a rest position and movable therefrom to opposite sides thereof, first and second normally open switch means alternately actuatable to closed positions by movement of said control lever to energize separate light flasher unit circuits, said circuits each including a relay energized upon closing of the switch means associated therewith, a holding circuit for maintaining the relay and left flasher unit circuit, return of said lever to a rest position opening said switch means, each of said holding circuit means including a normally closed switch opened upon energization of the relay associated with the other circuit and a normally open switch closed upon energization of the relay in its own circuit whereby the energization of one relay de-energizes the holding circuit for the other circuit containing the other relay by opening the normally closed switch for that latter named circuit, said holding circuit means for said first switch means being de-energized by opening of said normally closed other circuit switch upon the movement of said operator control means momentarily to a position closing the second of said switch means thereby energizing said other circuit relay, the subsequent movement of said control means to a position wherein both of said switches are in their normally open positions de-energizing both relays.

6. A directional signal system comprising, an operator movable control lever normally biased to a rest position and movable to opposite sides thereof, first and second normally open switch means actuatable alternately by said lever to closed positions upon movement of said lever to said opposite sides to energize separate light circuits, said circuits each including a relay energized upon closing of the switch means associated therewith, holding circuit means energized upon closure of each of said switch means to maintain energized the light circuit associated with whichever of the said switch means is closed upon return of the said switch means to its normally open position, said holding circuit means being connected in parallel with its switch means circuit and including a normally closed switch opened upon energization of the relay associated with the other switch means circuit whereby the energization of one relay de-energizes the holding circuit means for the other circuit containing the other relay by opening the normally closed switch for that latter named circuit, said holding circuit means also including a normally open switch closed upon energization of the relay in its own light circuit, the holding circuit means for one of said switch means being de-energized by opening of said normally closed other circuit switch upon the movement of said operator control means momentarily to a position closing the other of said switch means thereby energizing said other circuit relay, the subsequent movement of said control means to a position wherein both of said switches are in their normally open positions de-energizing both relays.

No references cited.

NEIL C. READ, *Primary Examiner.*

A. H. WARING, *Assistant Examiner.*